United States Patent
Magann et al.

(10) Patent No.: US 12,306,900 B1
(45) Date of Patent: May 20, 2025

(54) FEEDBACK-BASED QUANTUM OPTIMIZATION

(71) Applicant: National Technology & Engineering Solutions of Sandia, LLC, Albuquerque, NM (US)

(72) Inventors: Alicia Bette Magann, Titusville, NJ (US); Mohan Sarovar, Albany, CA (US); Kenneth Michael Rudinger, Albuquerque, NM (US); Matthew Grace, Oakland, CA (US)

(73) Assignee: National Technology & Engineering Solutions of Sandia, LLC, Albuquerque, NM (US)

(*) Notice: Subject to any disclaimer, the term of this patent is extended or adjusted under 35 U.S.C. 154(b) by 989 days.

(21) Appl. No.: 17/360,458

(22) Filed: Jun. 28, 2021

(51) Int. Cl.
*G06F 17/11* (2006.01)
*G06N 10/80* (2022.01)

(52) U.S. Cl.
CPC .............. *G06F 17/11* (2013.01); *G06N 10/80* (2022.01)

(58) Field of Classification Search
CPC ........ G06N 10/00; G06N 10/20; G06N 10/60; G06N 10/80; G06F 17/11; G06F 17/18
See application file for complete search history.

(56) References Cited

U.S. PATENT DOCUMENTS

| | | | |
|---|---|---|---|
| 11,120,357 B2* | 9/2021 | Zeng | G06F 15/76 |
| 2021/0334079 A1* | 10/2021 | Gambetta | G06N 10/00 |
| 2022/0253504 A1* | 8/2022 | Mandal | G06F 17/16 |

OTHER PUBLICATIONS

A.B. Magann, et al., Feedback-Based Quantum Optimization, Physical Review Letters 129, 250502 (2022), (Year: 2022).*
D. Wakeham et al., Feedback-Based Quantum Optimization (FALQON), found at https://pennylane.ai/qml/demos/tutorial_falqon/, PennyLane Demos, 2024 (Year: 2024).*
Farhi, et al., "A Quantum Approximate Optimization Algorithm", arXiv preprint arXiv:1411.4028, 2014, 16 Pages.

* cited by examiner

*Primary Examiner* — Emily E Larocque
(74) *Attorney, Agent, or Firm* — Calfee, Halter & Griswold LLP; Gregory M. Doudnikoff (57) ABSTRACT

A system for identifying approximate solutions to discrete optimization problems includes a quantum computing device. The quantum computing device iteratively configures a layered quantum circuit to evaluate a Hamiltonian representation of a cost function over a set of parameter values. After each iteration, the quantum computing device identifies a new parameter value based upon an estimate of an expectation value under the quantum state output by execution of the layered quantum circuit. The quantum computing device updates a configuration of the layered quantum circuit based upon the new parameter value. After a final iteration, the output quantum state of the layered quantum circuit is measured to identify an approximate solution vector. This solution vector is output as optimization results that are indicative of an approximate solution to the discrete optimization problem.

20 Claims, 6 Drawing Sheets

FEEDBACK-BASED QUANTUM OPTIMIZATION

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Discrete optimization problems arise in various contexts such as logistics, routing, and supply chain optimization. Conventionally these problems have been solved by way of classical computers (i.e., conventional non-quantum computers). As the number of variable parameters of a discrete optimization problem increases, however, solving the problem by way of a classical computer can become intractable. For instance, it may be difficult for a conventional optimization algorithm to avoid becoming trapped in local minima that are not representative of a true global minimum.

Recently, hybrid classical-quantum algorithms such as the quantum approximate optimization algorithm (QAOA) have been developed that encode an optimization problem into a Hamiltonian such that the solution to the optimization problem is encoded in the ground state of the Hamiltonian. In various algorithms, a computing system iteratively performs a method whereby a quantum computing device is used to evaluate a quantum algorithm that is representative of the optimization problem, and a classical computing device is used to optimize over a set of parameters that are used by the quantum computing device in evaluating the quantum algorithm. It is conjectured that these algorithms can provide superior approximate solutions for some discrete optimization problems.

SUMMARY

The following is a brief summary of subject matter that is described in greater detail herein. This summary is not intended to be limiting as to the scope of the claims.

Described herein are various technologies pertaining to a quantum computing system that is configured to identify solutions to discrete optimization problems. In exemplary embodiments, a quantum computing system includes a quantum computing device and a classical computing device. The quantum computing device is configured to iteratively evaluate a quantum function that is representative of a cost or objective function pertaining to a discrete optimization problem. The classical computing device can be employed in connection with programming the quantum computing device to solve the optimization problem. For example, the classical computing device can be configured to provide control signals to the quantum computing device that cause the quantum computing device to assume various configurations.

The quantum computing device computes an approximate solution to a discrete optimization problem. The quantum computing device iteratively configures a layered quantum circuit (e.g., based upon control signals received from the classical computing device) to evaluate a Hamiltonian representation of a cost function over a set of parameter values. After each iteration, the quantum computing device identifies a new parameter value for the next layer of the quantum circuit based upon measurements on an output state of the layered quantum circuit. The quantum computing device updates a configuration of the layered quantum circuit based upon the new parameter value. After a final iteration, the measurements on the output state of the circuit are indicative of an approximate solution to the discrete optimization problem.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Various technologies pertaining to a quantum computing system for solving discrete optimization problems are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

Figure 1:
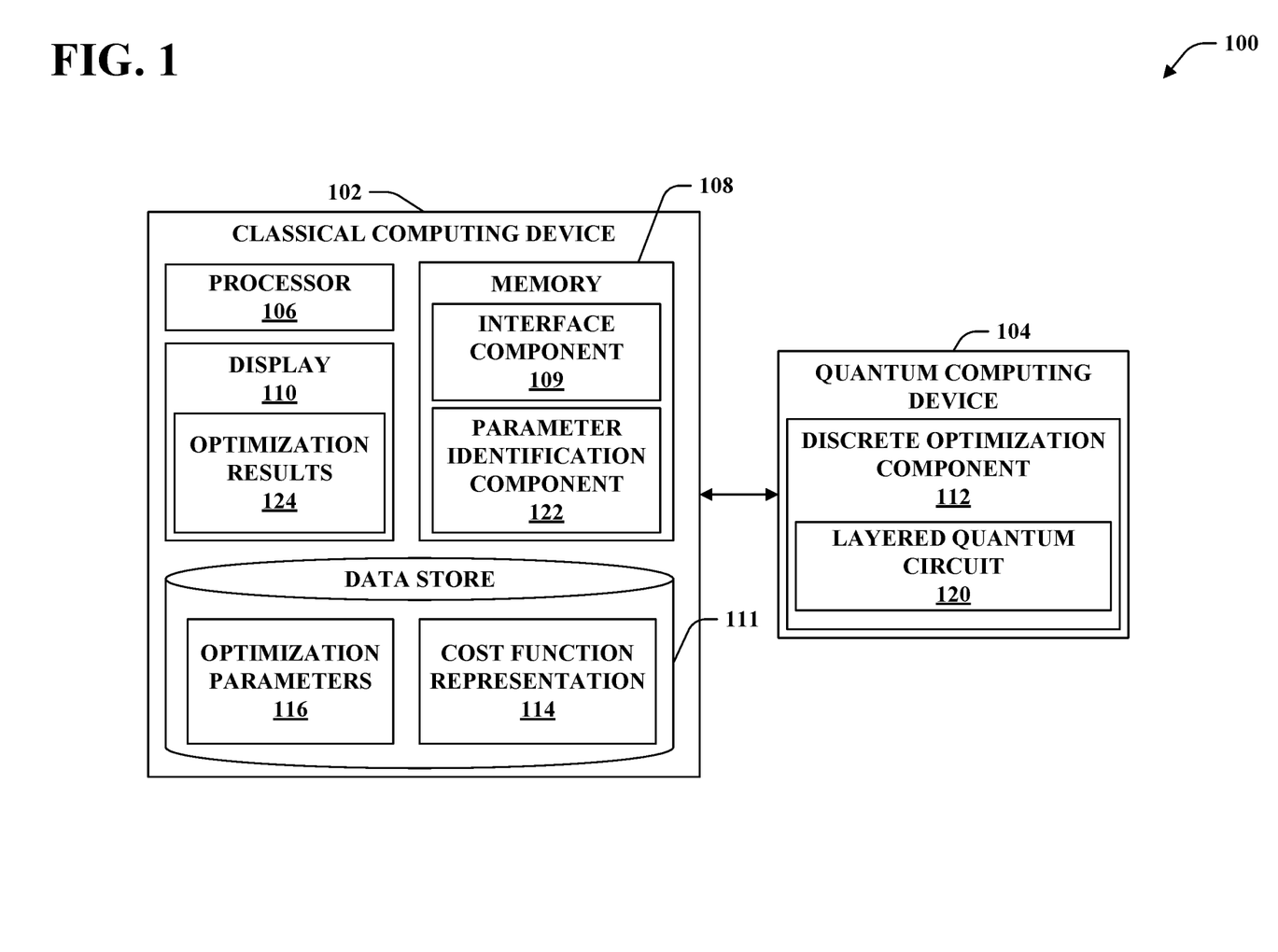
FIG. 1 is a functional block diagram of an exemplary computing system that facilitates identifying solutions to discrete optimization problems.

With reference to FIG. 1, an exemplary system 100 that facilitates identifying solutions to discrete optimization problems by way of a quantum computer is illustrated. The system 100 includes a classical computing device 102 and a quantum computing device 104. The classical computing device 102 is a non-quantum computing device. The classical computing device 102 includes a processor 106, memory 108, a display 110, and a data store 111. The memory 108 includes an interface component 109 that is configured to facilitate communication between the classical computing device 102 and the quantum computing device 104. For instance, the interface component 109 can facilitate communication between the classical computing device 102 and the quantum computing device 104 for purposes of programming the quantum computing device 104 or reading out computation or measurement results from the quantum computing device 104. The quantum computing device 104 includes a discrete optimization component 112. The discrete optimization component 112 is configured to iteratively evaluate solutions to a discrete optimization problem based upon executing a parametrized quantum algorithm and identifying further parameters of the quantum algorithm, such that an expectation value of a cost function representation of the discrete optimization problem decreases as more iterations are performed.

The data store 111 stores a representation 114 of a cost function that is itself representative of a discrete optimization problem. The data store 111 further stores a set of optimization parameters 116 that are a prescription for generating an approximate solution to the discrete optimization problem. It is to be understood that, as used herein, the term "solution," as applied to a discrete optimization problem, can refer to a set of inputs to a cost function that is representative of the discrete optimization problem, wherein the set of inputs yields a value of the cost function that satisfies one or more of various criteria. For example, the set of inputs can yield a value of the cost function that is below a target threshold of the cost function. It is to be understood, therefore, that as used herein an approximate solution of a discrete optimization problem is not necessarily a solution that yields a global minimum of the cost function that is representative of the discrete optimization problem. In an exemplary embodiment, the cost function representation 114 comprises a problem Hamiltonian Hr.

The discrete optimization component 112 is configured to prepare, based upon the cost function representation 114, an approximate solution to the cost function. The discrete optimization component 112 includes a layered quantum circuit 120. The layered quantum circuit 120 and components thereof that are described herein can be embodied by any of various configurable quantum hardware that is configured to perform the functionality of the layered quantum circuit 120 referred to herein. The memory 108 further includes a parameter identification component 122. The parameter identification component 122 outputs configuration instructions to the discrete optimization component 112 that cause the discrete optimization component 112 to iteratively configure the layered quantum circuit 120 to evaluate the cost function over a set of parameter values. After each iteration, the discrete optimization component 112 identifies a new parameter value based upon execution of the layered quantum circuit 120, and updates a configuration of the layered quantum circuit 120 based upon the new parameter value. In an exemplary embodiment, the new parameter is identified based upon an estimate of the expectation value of a chosen observable on the output quantum state of the layered quantum circuit 120. This expectation value is estimated using multiple executions of the latest iteration of layered quantum circuit 120. Stated differently, the parameter identification component 122 can identify a parameter $\beta_k$ for a kth iteration of the layered quantum circuit 120 based upon an estimated expectation value $A_{k-1}$, that is the estimated expectation value of a chosen observable under the output quantum state of the (k−1)th iteration of the layered quantum circuit 120.

The updated configuration of the layered quantum circuit 120 is based upon the new parameter value and the previously-identified parameter values of the previous iterations. Referencing the example above, the configuration of the layered quantum circuit 120 for a kth iteration can be based upon parameters $\beta_1, \beta_2, \ldots \beta_k$. In a final iteration, an estimate of the cost function under the output quantum state of the layered quantum circuit 120 $|\psi_k\rangle$ is obtained. This can be an estimate of the expectation value of the chosen observable under the output quantum state $|\psi_k\rangle$, which can be formed from multiple executions of the layered quantum circuit 120 and associated measurements of the output quantum state $|\psi_k\rangle$. In addition, measurements of the output state $|\psi_k\rangle$ reveal an approximate solution to the original discrete optimization problem. If a termination condition is met, the estimated value of the cost function and an approximate problem solution or set of solutions can be output to the classical computing device 102. The estimated value of the cost function and the approximate problem solution or solutions can then be displayed as optimization results 124 on the display 110. It is to be understood that while in some embodiments, the estimate of the cost function under the output quantum state $|\psi_k\rangle$ can be computed as an estimate of the expectation value of the chosen observable in a final kth configuration of the layered quantum circuit 120, in other embodiments the estimate of the cost function can be computed by the classical computing device 102 based upon an approximate problem solution (e.g., a measured value of $|\psi_k\rangle$) received by the classical computing device 102 from the quantum computing device 104. As referred to herein, a cost function value described as being associated with or pertaining under a quantum state can be estimated or computed by these or substantially any other suitable means.

The discrete optimization component 112 can be configured to perform substantially any number of iterations of parameter identification and updating of the configuration of the layered quantum circuit 120. The discrete optimization component 112 can be configured to iteratively identify new parameters and update the configuration of the layered quantum circuit 120 until a termination condition has been met. In exemplary embodiments, the discrete optimization component 112 iteratively updates the layered quantum circuit 120 until the cost function value associated with the output quantum state of the layered quantum circuit 120 is less than a threshold value. In other embodiments, the discrete optimization component 112 iteratively updates the layered quantum circuit 120 until a computational budget is expended. For example, the discrete optimization component 122 can iteratively update the layered quantum circuit 120 until a predefined amount of time has elapsed. In another example, the discrete optimization component 122 can update the layered quantum circuit 120 a predefined number of times such that the layered quantum circuit 120 has a number of layers equal to the predefined number.

The parameter identification component 122 iteratively identifies new parameters and updates the layered quantum circuit 120 such that the associated cost function value of the output quantum state of the layered quantum circuit 120 decreases with each additional layer. The discrete optimization problem can be represented by a quantum system whose dynamics are governed by the following equation:

$$i\frac{d}{dt}|\psi(t)\rangle = (H_p + H_d\beta(t))|\psi(t)\rangle \qquad \text{Eq. 1}$$

where $|\psi(t)\rangle$ is the time-dependent state vector of the quantum system, $H_p$ is a problem Hamiltonian representative of a cost function (e.g., as represented by the cost function representation 114), and $H_d$ is a driver or control Hamiltonian that couples a scalar, time-dependent control function $\beta(t)$ to the quantum system. It is assumed that $H_d$ does not commute with $H_p$, such that $[H_d, H_p] \neq 0$. The control function $\beta(t)$ can be selected to minimize an expectation value of $H_p$ over time, such that:

$$\frac{d}{dt}\langle\psi(t)|H_p|\psi(t)\rangle(t) \leq 0, \forall t \qquad \text{Eq. 2}$$

If the problem Hamiltonian $H_p$ and the control Hamiltonian $H_d$ are applied to the state of the quantum system in an alternating fashion, the system can be represented by a time evolution of the form:

$$U = U_d(\beta_l)U_p \ldots U_d(\beta_1)U_p \qquad \text{Eq. 3}$$

where $$U_p = e^{-iH_p\Delta t}, U_d(\beta_k) = e^{-i\beta_k H_d\Delta t}, \qquad \text{Eqs. 4}$$

such that after each period of $\Delta t$, the Hamiltonian applied to the quantum state $|\psi(t)\rangle$ alternates between $H_p$ and $H_d$. It is to be understood that in some embodiments $\Delta t$ is kept constant, whereas in other embodiments $\Delta t$ can be selected adaptively. In exemplary embodiments, to satisfy Eq. 2, $\beta_k$ can be selected such that $$\beta_{k+1} = -A_k, \text{ where } A_k = \langle\psi_k|i[H_d, H_p]|\psi_k\rangle, \qquad \text{Eqs. 5}$$

where $|\psi_k\rangle$ is the state after k iterations are applied to an input state $|\psi_0\rangle$, or formally, $|\psi_k\rangle = U_d(\beta_k)U_p \ldots U_d(\beta_1)U_p|\psi_0\rangle$. In other embodiments, the value of $\beta_{k+1}$ can be some other function of the estimated value of $A_k$ that satisfies Eq. 2. The discrete optimization component 112 configures the layered quantum circuit 120 to alternately apply quantum functions $U_p$ and $U_d(\beta_k)$, as defined by Eqs. 4, to an input quantum state $|\psi_0\rangle$. Based upon measurements on an output quantum state $|\psi_k\rangle$ of a kth layer of the layered quantum circuit 120, the discrete optimization component 112 identifies a parameter $\beta_{k+1}$ that is used to implement a (k+1)th layer of the layered quantum circuit 120. The discrete optimization component 112 iteratively identifies parameters and implements additional layers of the layered quantum circuit 120 until a termination condition is met. Responsive to the termination condition being met, the parameter identification component 122 can read out from the quantum computing device 104 (e.g., by way of the interface component 109) any or all of the set of parameters $\beta = \beta_1, \beta_2, \ldots, \beta_l$, an approximate solution (for example, in the form of a bit string or approximate solution vector) for the discrete optimization problem encoded in $H_p$ by measuring the final output state $|\psi_k\rangle$, and through repeated executions of this final quantum circuit, an estimate of the cost function value that is the expectation value, $\langle H_p \rangle$, of the output quantum state of the final layered quantum circuit 120. The approximate solution vector, the associated cost function value, and/or the set of parameters $\beta$ can be stored by the parameter identification component 122 as the optimization parameters 116. In other embodiments, the approximate solution vector and the associated cost function value can be output to the display 110 as the optimization results 124.

Figure 2:
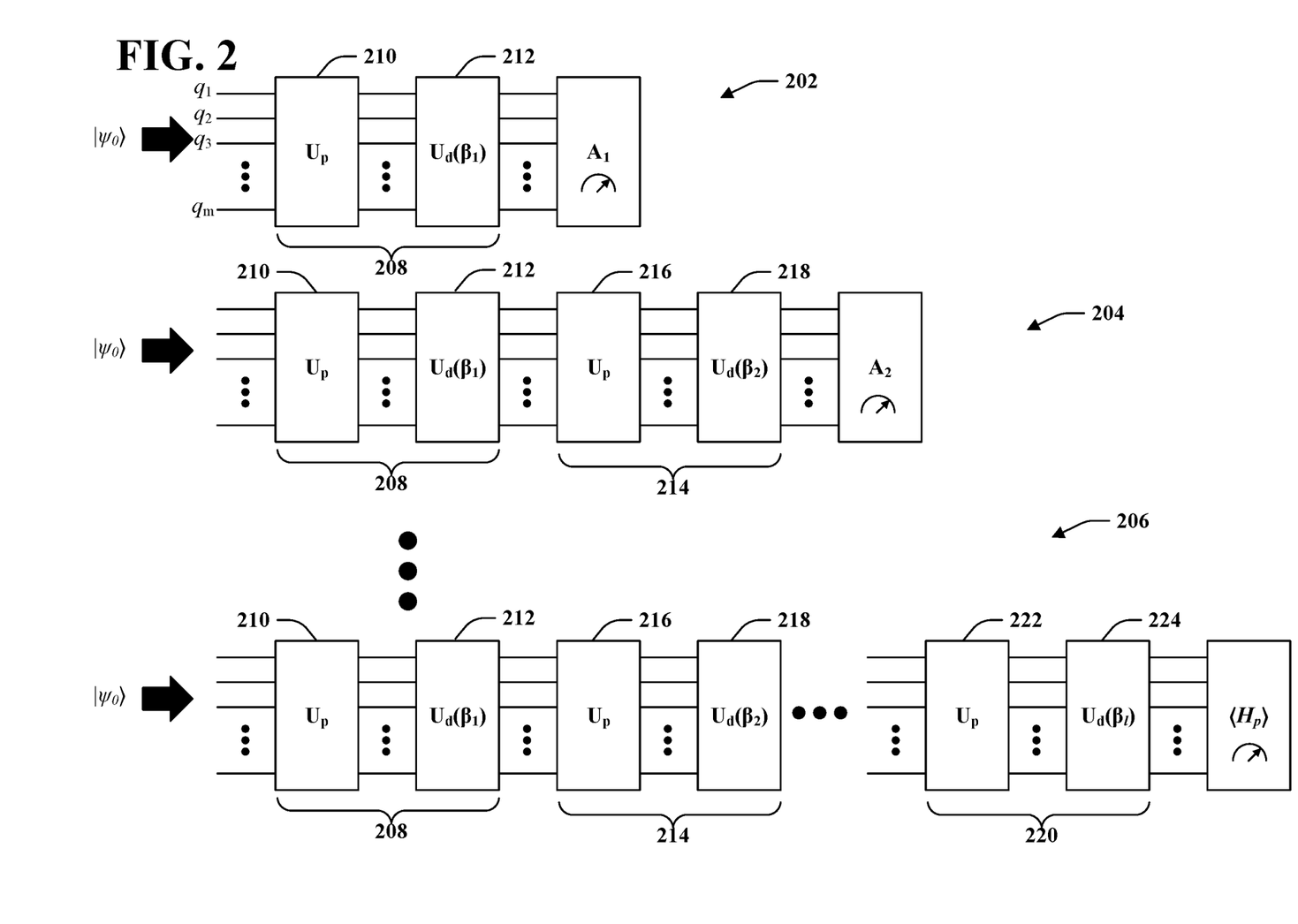
FIG. 2 is an exemplary set of layered quantum circuit diagrams.

Referring now to FIG. 2, an exemplary series of 1 configurations 202-206 of the layered quantum circuit 120 are illustrated. The configurations 202-206 shown are each representative of a different iteration of a quantum algorithm executed by the discrete optimization component 112 in connection with preparing a solution to the discrete optimization problem represented by the cost function representation 114. Each of the configurations 202-206 takes as input an initial quantum state $|\psi_0\rangle$. The quantum state $|\psi_0\rangle$ can comprise m qubits, $q_1, q_2, \ldots q_m$ where m is a positive integer. The number m of the qubits is determined by the discrete optimization problem that the layered quantum circuit 120 is configured to solve.

The first configuration includes a first layer 208. The first layer 208 includes a first quantum logic component 210 and a second quantum logic component 212. It is to be understood that the quantum logic components 210, 212 and other quantum logic components shown in FIG. 2 can be representative of operations that are performed by single quantum gates or multiple quantum gates. The first quantum logic component 210 performs an operation $U_p$ over the initial quantum state $|\psi_0\rangle$. The second quantum logic component 212 performs operation $U_d(\beta_1)$ over the output of the first quantum logic component 210. Thus, at the output of layer 208 there is a quantum state $|\psi_1\rangle = U_d(\beta_1)U_p|\psi_0\rangle$. The operation $U_p$ is determined by the discrete optimization problem that the layered quantum circuit 120 is configured to solve, which can be represented by the problem Hamiltonian $H_p$. For example, $U_p$ can be set according to $U_p = e^{-iH_p\Delta t}$ as specified in Eqs. 4. The operation $U_d(\beta_1)$ performed by the second quantum logic component 212 can be selected from among various quantum gate operations by selection of the control Hamiltonian $H_d$, but in various embodiments can be based upon the form $U_d(\beta_k) = e^{-i\beta_k H_d\Delta t}$ set forth above in Eqs. 4. At the output of layer 208 (i.e., a quantum state at the output of the second quantum logic component 212), an expectation value $A_1$ of a suitably defined operator under quantum state $|\psi_1\rangle$ is estimated.

In each successive configuration, an additional layer is added to the layered quantum circuit 120, while retaining the layers of the previous configuration. The additional layer is based upon the expectation value estimated at the end of the previous configuration. Thus, the second configuration 204 includes the first layer 208 comprising the first and second quantum logic components 210, 212, and a second layer 214 that comprises a third quantum logic component 216 that performs operation $U_p$ over the output state of the first layer 208 $|\psi_1\rangle$ and a fourth quantum logic component 218 that performs operation $U_d(\beta_2)$ over the output of the third quantum logic component 208, where $\beta_2$ is a parameter value based upon the computed estimation of the expectation value $A_1$ estimated at the end of the previous configuration 202. In an exemplary embodiment, the parameter $\beta_2$ is set equal to the estimate of $-A_1$. Each successive layer of the layered quantum circuit 120 includes the common quantum function $U_p$, although it is to be understood that in each layer this function can be performed by different physical quantum gates. Each successive layer of the layered quantum circuit 120 additionally includes a distinct quantum function $U_d(\beta_k)$ that depends on parameter value $\beta_k$ that is based upon an output quantum state of an immediately preceding layer in the layered quantum circuit 120.

In exemplary embodiments, a (k+1)th layer of the layered quantum circuit 120 includes a first quantum logic component that performs operation $U_p$ over an output quantum state $|\psi_0\rangle$ of an immediately preceding layer k, and a second quantum logic component that performs operation $U_d(\beta_{k+1})$ where $\beta_{k+1}=-A_k$. It is to be understood that while $A_k$ refers to an expectation value of an observable, the quantum computing device 104 and/or the classical computing device 102 can be configured to employ an estimate of $A_k$ that is based upon measurements of the observable. Thus, as used herein, reference to the expectation value $A_k$ is intended to encompass estimates of $A_k$. In various embodiments, an initial parameter $\beta_1$ can be set equal to zero. However, other initial values of $\beta_1$ are contemplated as being within the scope of the present disclosure.

From the foregoing, the final, lth configuration 206 of the layered quantum circuit 120 shown in FIG. 2 includes a plurality of l layers, including a final lth layer 220 that includes two quantum logic components 222, 224, $U_p$ and $U_d(\beta_l)$. The lth configuration 206 of the layered quantum circuit 120 can be written as equivalent to preparing a quantum state $|\psi_l\rangle$ where:

$$|\psi_l\rangle = U_d(\beta_l)U_p \ldots U_d(\beta_2)U_p U_d(\beta_1)U_p |\psi_0\rangle \quad \text{Eq. 6}$$

and $$\beta_{k+1} = -A_k \quad \text{Eq. 7}$$

At the output of the final quantum logic component 224 that performs operation $U_d(\beta_l)$, an expectation value $\langle H_p \rangle$ of an observable subject to the output quantum state $|\psi_l\rangle$ can be measured. As noted above, if a termination criterion is met, the cost function value is estimated from repeated executions of the layered quantum circuit 206, and a solution vector representing the solution to the discrete optimization problem is read out by the classical computing device 102. The parameters $\beta = \beta_1, \beta_2, \ldots, \beta_l$ can be stored as optimization parameters 116 and/or the cost function value, the solution vector and its corresponding parameters $\beta$ can be displayed on the display 110 as optimization results 124.

While in various embodiments described above the layered quantum circuit 120 as having a parameter $\beta_l$ associated with an lth layer of the layered quantum circuit 120, it is to be understood that in other embodiments multiple parameters can be associated with each of the layers of the layered quantum circuit. For example, the discrete optimization problem can be represented by a quantum system whose dynamics are governed by the following equation:

$$i\frac{d}{dt}|\psi(t)\rangle = \left(H_p + \sum_{j=1}^{j_{max}} H_d^j \beta^j(t)\right)|\psi(t)\rangle \quad \text{Eq. 8}$$

where $|\psi(t)\rangle$ is the time-dependent state vector of the quantum system, $H_p$ is a problem Hamiltonian representative of a cost function (e.g., as represented by the cost function representation 114), and $H_d^1, H_d^2, \ldots, H_d^{j_{max}}$ are control Hamiltonians that couple associated scalar, time-dependent control functions $\beta^1(t), \beta^2(t), \ldots \beta^{j_{max}}(t)$ to the quantum system, where $j_{max}$ can be any positive integer. It is assumed that no member of the set of control Hamiltonians $H_d^1, H_d^2, \ldots, H_d^{j_{max}}$ commutes with $H_p$. The control functions $\beta^1(t), \beta^2(t), \ldots \beta^{j_{max}}(t)$ can be selected to minimize an expectation value of $H_p$ over time, such that:

$$\frac{d}{dt}(\psi(t)|H_p|\psi(t)\rangle(t) \leq 0, \forall t \quad \text{Eq. 9}$$

If the problem Hamiltonian $H_p$ and the control Hamiltonians $H_d^1, H_d^2, \ldots, H_d^{j_{max}}$ are applied to the state of the quantum system in an alternating fashion, the system can be represented by a time evolution of the form:

$$U = U_d(\beta_l^1, \beta_l^2, \ldots, \beta_l^{j_{max}})U_p \ldots U_d(\beta_1^1, \beta_1^2, \ldots, \beta_1^{j_{max}})U_p \quad \text{Eq. 10}$$

where $$U_p = e^{-iH_p \Delta t}, \quad \text{Eqs. 11}$$

$$U_d(\beta_k^1, \beta_k^2, \ldots, \beta_k^{j_{max}}) = e^{-i\beta_k^1 H_d^1 \Delta t} \times e^{-i\beta_k^2 H_d^2 \Delta t} \times \ldots \times e^{-i\beta_k^{j_{max}} H_d^{j_{max}} \Delta t}$$

In exemplary embodiments, to satisfy Eq. 9, each $\beta_k^j$ can be selected such that $$\beta_{k+1}^j = -A_k^j, \text{ where } A_k^j = \langle \psi_k | i[H_d^j, H_p] | \psi_k \rangle \quad \text{Eqs. 12}$$

where $|\psi_k\rangle$ is the state after k iterations are applied to an input state $|\psi_0\rangle$, or formally, $|\psi_k\rangle = U_d(\beta_k^1, \beta_k^2, \ldots, \beta_k^{j_{max}})U_p \ldots U_d(\beta_1^1, \beta_1^2, \ldots, \beta_1^{j_{max}})U_p|\psi_0\rangle$. In other embodiments, the value of each $\beta_{k+1}^j$ can be some other function of the estimated value of $A_k^j$.

In embodiments wherein the discrete optimization problem is represented by a quantum system governed by Eq. 8, the layered quantum circuit 120 can be configured such that a layer-dependent quantum logic component in an lth layer performing operation $U_d$ has functionality depending on a set of parameters $\beta_l^j = \beta_l^1, \beta_l^2, \ldots, \beta_l^{j_{max}}$ rather than a single parameter $\beta_l$. For example, and referring once again to FIG. 2, the quantum logic component 212 can be configured to perform operation $U_d(\beta_1^1, \beta_1^2, \ldots, \beta_1^{j_{max}})$, the quantum logic component 218 can be configured to perform operation $U_d(\beta_2^1, \beta_2^2, \ldots, \beta_2^{j_{max}})$, and the quantum logic component 224 can be configured to perform operation $U_d(\beta_l^1, \beta_l^2, \ldots, \beta_l^{j_{max}})$ For such embodiments, in each of the successive configurations of the layered quantum circuit 120, the set of parameters of the previous layer can be held fixed.

The technologies described herein are conjectured to present an improvement over both classical optimization algorithms configured for execution on a classical computing device and existing quantum algorithms for solving discrete optimization problems such as QAOA. In particular, QAOA employs an optimization scheme that attempts to minimize the expectation value $\langle H_p \rangle$ of the problem Hamiltonian based upon a quantum algorithm parametrized over a set of 2l parameters, where l is a specified number of iterations of the QAOA gates. QAOA still employs classical optimization over the entire set of 2l parameters to identify the approximate solution to the original discrete optimization problem. However, this classical optimization can quickly become intractable as the number of parameters increases.

By contrast, in each successive layer of the layered quantum circuit 120, previously-identified $\beta$ parameters can be held fixed, and a parameter value for a next layer in the circuit 120 can be computed from a measurable output of the layered quantum circuit 120. Further, the parameter values β are selected to ensure that the cost function is monotonically decreasing with respect to the depth of the quantum circuit. Still further, the optimization performed by the layered quantum circuit 120 does not require the classical computing device 102 to perform optimization operations. It is to be understood that in the computing system 100, the classical computing device 102 performs functionality to facilitate interfacing between a user of the classical computing device 102 and the quantum computing device 104, which quantum computing device 104 may not be configured to facilitate direct user interaction or configuration.

It is to be understood that the set of parameters β associated with the layered quantum circuit 120 (e.g., as identified by the parameter identification component 122) can be used to "seed" an execution of QAOA. Stated differently, the set of parameters β associated with the layered quantum circuit 120 in any of the configurations of the layered quantum circuit 120 can be used as initial parameters of a QAOA representation of the same discrete optimization problem solved by the layered quantum circuit 120. In a non-limiting example, the discrete optimization component 112 can be configured to iteratively configure the layered quantum circuit 120 until an iteration condition is met, as described above. Continuing the example, the discrete optimization component 112 can be configured to read out the set of parameters β associated with a final configuration of the layered quantum circuit 120. The parameter identification component 122 and the discrete optimization component 112 can then jointly execute an instantiation of QAOA taking the set of parameters β as initial values of parameters of the instantiation of QAOA. In response to completing execution of the instantiation of QAOA (e.g., in response to an iteration condition or an optimization condition associated with the instantiation of QAOA being met), the classical computing device 102 can output results of the instantiation of QAOA, such as a quantum state solution vector, final parameter values, and/or a final expectation value, to the display 110 as optimization results 124.

Figure 3:
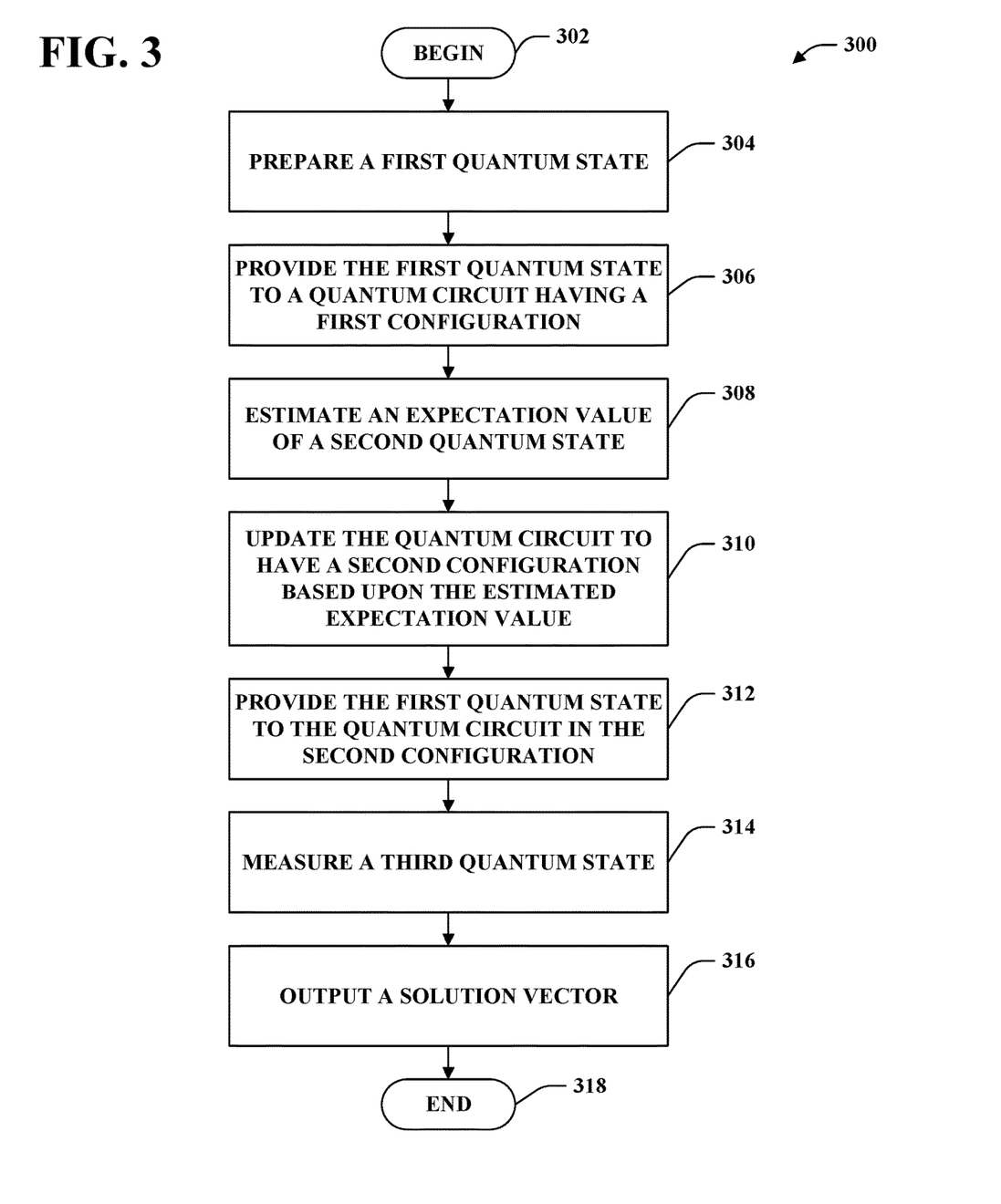
FIG. 3 is a flow diagram that illustrates an exemplary methodology for identifying solutions to a discrete optimization problem by way of a quantum computing device.
Figure 4:
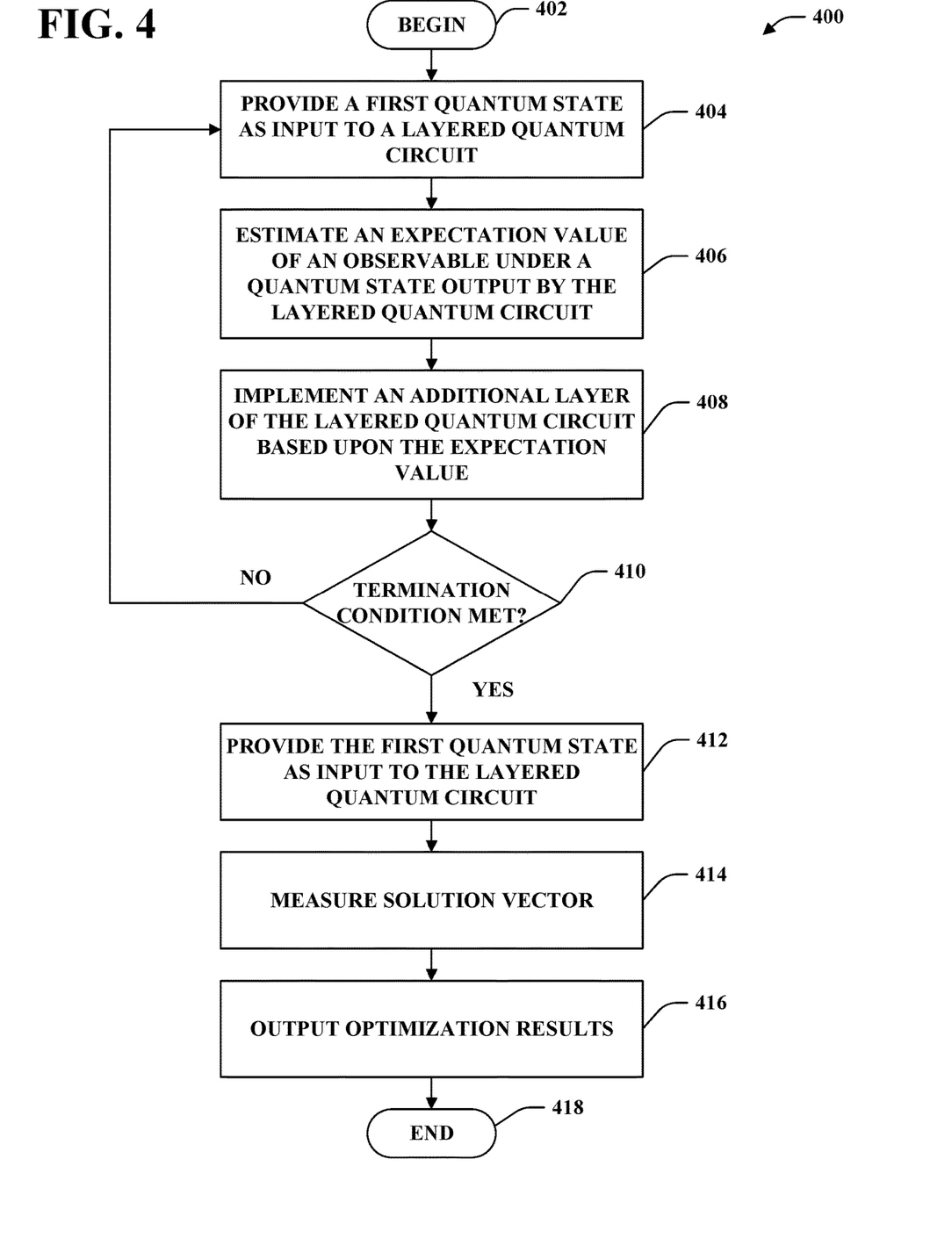
FIG. 4 is a flow diagram that illustrates an exemplary methodology for configuring a layered quantum circuit.

FIGS. 3 and 4 illustrate exemplary methodologies relating to performing discrete optimization by way of a quantum computing device. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 3, a methodology 300 that facilitates identifying a solution to a discrete optimization problem that is represented by a cost function is illustrated. The methodology 300 begins at 302, and at 304, a first quantum state is prepared. At 306, the first quantum state is provided to a quantum circuit having a first configuration, wherein the first configuration of the quantum circuit is configured to output a second quantum state responsive to receiving the first quantum state. At 308, an expectation value A of an observable under the second quantum state is estimated. At 310, the quantum circuit is updated to have a second configuration based upon the expectation value estimated at 308. For example, the first configuration of the quantum circuit can have a first layer and the second configuration of the quantum circuit can have a second layer in addition to the first layer. The second layer can include a quantum logic component that performs an operation based upon a parameter value, wherein the parameter value is selected based upon the expectation value estimated at 308. In an exemplary embodiment, the parameter value can be a negative of the expectation value estimated at 308.

At 312, the first quantum state can be provided to the quantum circuit in the second configuration. The second configuration of the quantum circuit is configured to output a third quantum state in response to receiving the first quantum state. The second configuration is configured such that a value of the cost function that represents the discrete optimization problem evaluated under the third quantum state is less than a value of the cost function under the second quantum state. At 314, the third quantum state output by the second configuration of the quantum circuit is measured. The results of the measurement of the third quantum state can be taken as a solution vector of a discrete optimization problem that the quantum circuit is configured to solve. At 316, the solution vector measured at 314 is output as optimization results, wherein the optimization results pertain to the discrete optimization problem. The optimization results can further include parameter values for the quantum circuit and/or a value of the cost function evaluated under the solution vector. At 318, the methodology 300 ends.

Referring now to FIG. 4, a methodology 400 for iteratively configuring a layered quantum circuit to prepare a solution to a discrete optimization problem is illustrated. The methodology 400 begins at 402 and at 404, a first quantum state is provided as input to a layered quantum circuit. The layered quantum circuit can initially include a single first layer. At 406, an expectation value A of an observable under a quantum state output by the layered quantum circuit is estimated. Moreover, the cost function achieved by the output state can be estimated. At 408, an additional layer of the layered quantum circuit is implemented based upon this estimated expectation value. By way of example, and not limitation, the layered quantum circuit can be updated to include the first layer and a second layer, wherein the second layer receives a quantum state from the first layer. Continuing the example, the second layer includes a quantum gate or gates that is/are configured to perform an operation as a function of a parameter value. The parameter value can be selected based upon the expectation value estimated at 406. In a non-limiting example, the parameter value can be selected to be a negative of the expectation value estimated at 406.

At 410, a determination is made whether a termination condition is met. The termination condition can be a condition that depends on a cost function value (e.g., which can be estimated at 406 in addition to the expectation value). For example, the termination condition can be whether the estimated cost function value is below a threshold value. In another example, the iteration condition can be whether the measured expectation value is less than a previously-measured expectation value. In another exemplary embodiment, the termination condition can be based upon a computational budget, such as an amount of elapsed time or a number of performed iterations (e.g., number of layers of the layered quantum circuit implemented).

If the termination condition is not met at 410, the methodology returns to 404 and the first quantum state is provided as input to the layered quantum circuit (including the additional layer implemented at 408). The methodology 400 then proceeds again through steps 406 and 408. Once the termination condition is met at 410, the methodology 400 proceeds to 412, whereupon the first quantum state is again provided as input to the layered quantum circuit. At 414, an approximate solution vector is measured (e.g., by measuring a quantum state output by the final configuration of the layered quantum circuit). At 416, optimization results that include the solution vector measured at 414 are output. The optimization results output at 416 can further include a final cost function value associated with the quantum state output by the final configuration of the layered quantum circuit, or the circuit parameters β of the final configuration of the layered quantum circuit. In various embodiments, the optimization results can be output to a classical computing device, whereupon the classical computing device displays the optimization results on a display and/or stores the optimization results in a data store. The methodology 400 completes at 418.

Figure 5:
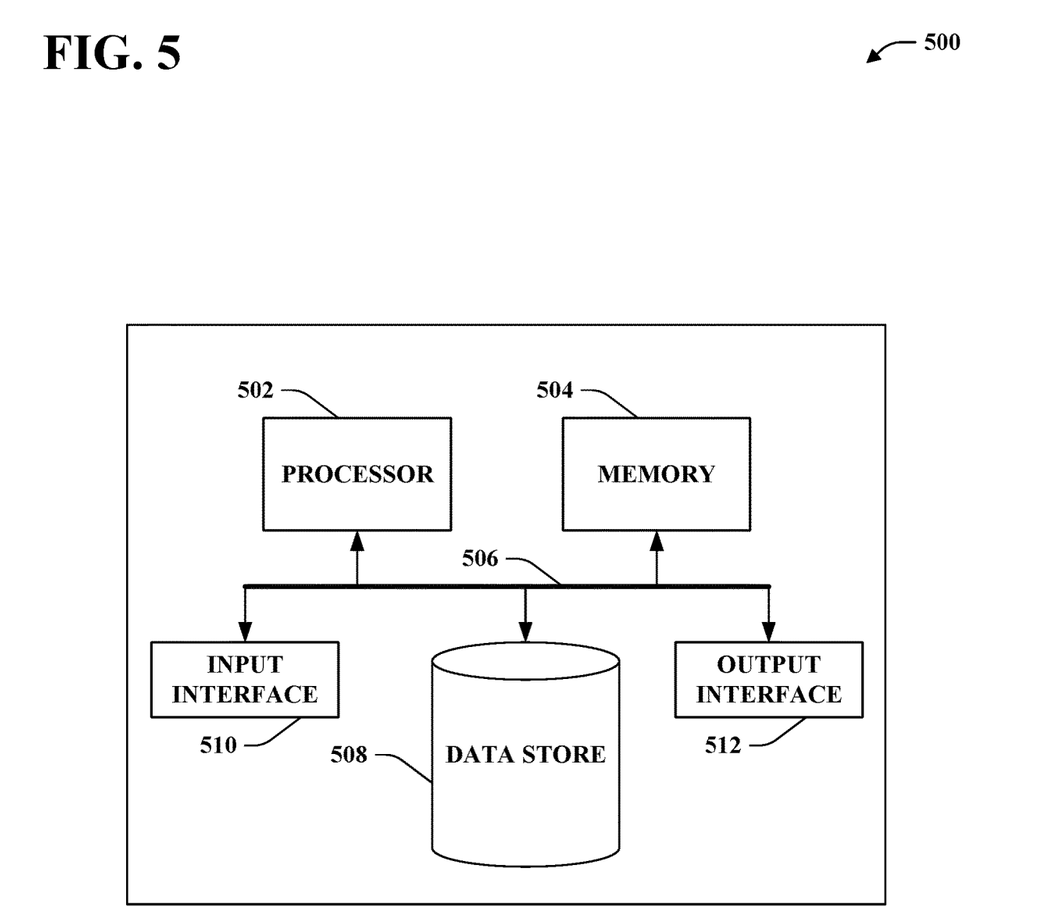
FIG. 5 is an exemplary classical computing system.

Referring now to FIG. 5, a high-level illustration of an exemplary classical computing device 500 that can be used in accordance with the systems and methodologies disclosed herein is illustrated. For instance, the classical computing device 500 may be used in the system 100 to facilitate interface with the quantum computing device 104. The classical computing device 500 includes at least one processor 502 that executes instructions that are stored in a memory 504. The instructions may be, for instance, instructions for implementing functionality described as being carried out by one or more components discussed above or instructions for implementing one or more of the methods described above. The processor 502 may access the memory 504 by way of a system bus 506. In addition to storing executable instructions, the memory 504 may also store optimization results, optimization parameters, and the like.

The classical computing device 500 additionally includes a data store 508 that is accessible by the processor 502 by way of the system bus 506. The data store 508 may include executable instructions, optimization parameters (e.g., the optimization parameters 116), a representation of a cost function that represents a discrete optimization problem (e.g., the cost function representation 114), etc. The classical computing device 500 also includes an input interface 510 that allows external devices to communicate with the classical computing device 500. For instance, the input interface 510 may be used to receive instructions from an external computer device, from a user, etc. The classical computing device 500 also includes an output interface 512 that interfaces the classical computing device 500 with one or more external devices. For example, the classical computing device 500 may display text, images, etc., by way of the output interface 512.

It is contemplated that the external devices that communicate with the classical computing device 500 via the input interface 510 and the output interface 512 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the classical computing device 500 in a manner free from constraints imposed by input devices such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the classical computing device 500 may be a distributed system. Thus, for instance, several devices may be in communication by way of a network connection and may collectively perform tasks described as being performed by the classical computing device 500.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), LaserDisc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Figure 6:
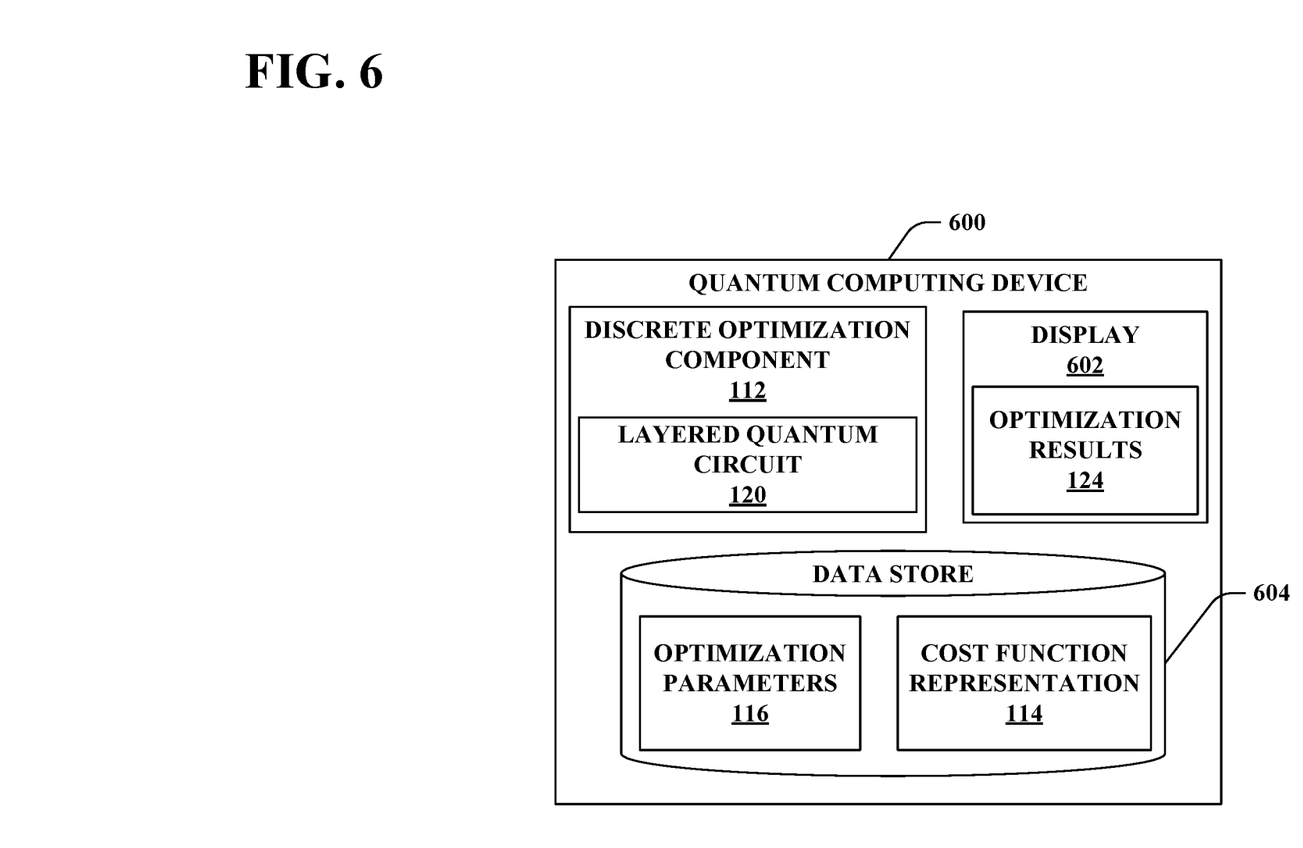
FIG. 6 is a functional block diagram of an exemplary quantum computing system that facilitates identifying solutions to discrete optimization problems.

It is further to be understood that various functionality that is described herein as being performed by the classical computing device 102 can instead be performed by a quantum computing device. By way of example, and referring now to FIG. 6, a quantum computing device 600 is shown, wherein the quantum computing device 600 includes the discrete optimization component 112 and the layered quantum circuit 120, a display 602, and a datastore 604. The quantum computing device 600 can be embodied by substantially any hardware that is capable of preparing and performing desired operations on quantum states. It is to be understood that the data store 604 can be or include a data store that is configured to store quantum states. In some embodiments, the data store 604 can be further configured to store classical/conventional computer-readable binary data. In various embodiments, the data store 604 can be embodied by multiple components such as a classical computer-readable data store and a quantum data store. The data store 604 can include the cost function representation 114 and the optimization parameters 116. The discrete optimization component 112 can be configured to output a solution vector, a cost function value, and/or a set of parameters of the layered quantum circuit 120 to the data store 604 as optimization parameters 116 or to the display 602 as the optimization results 124. Accordingly, it is to be understood that in some embodiments a user can interact directly with the quantum computing device 600 in connection with identifying a solution to a discrete optimization problem, rather than interacting with the classical computing device 102 as an intermediary to the quantum computing device 104.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for identifying solutions to a discrete optimization problem, the system comprising:
    a quantum computing device comprising a layered quantum circuit, the quantum computing device configured to perform the following acts:
        preparing a first quantum state for input to the layered quantum circuit;
        executing a first configuration of the layered quantum circuit, the layered quantum circuit comprises a first layer in the first configuration, wherein the first configuration of the layered quantum circuit is configured to output a second quantum state responsive to the first quantum state;
        estimating an expectation value under the second quantum state;
        updating the layered quantum circuit to a second configuration that comprises a second layer, wherein the second layer is based upon a parameter value, the parameter value based upon the estimated expectation value under the second quantum state such that a quantum function included in the second layer depends on the parameter value based upon the second quantum state output by the first layer;
        executing the second configuration of the layered quantum circuit, wherein the second configuration of the layered quantum circuit is configured to output a third quantum state responsive to the first quantum state;
        measuring a value of the third quantum state, the value of the third quantum state representative of a solution to the discrete optimization problem; and
        outputting the measured value of the third quantum state as optimization results.

2. The system of claim 1, further comprising a classical computing device, the classical computing device including at least one processor, memory, and a display, wherein the memory of the classical computing device stores computer-executable instructions that, when executed by the at least one processor, cause the at least one processor to read out the optimization results from the quantum computing device and to output the optimization results to the display.

3. The system of claim 1, wherein the second configuration of the layered quantum circuit further comprises the first layer.

4. The system of claim 3, wherein the first configuration of the layered quantum circuit comprises a first quantum function and a second quantum function, and wherein the second configuration of the layered quantum circuit comprises the first quantum function, the second quantum function, a third quantum function, and a fourth quantum function, wherein the first quantum function and the third quantum function are a common quantum function configured to perform a same operation.

5. The system of claim 4, wherein the fourth quantum function is the quantum function included in the second layer that depends on the parameter value based upon the second quantum state output by the first layer such that an operation performed by the fourth quantum function is based upon the parameter value.

6. The system of claim 5, wherein an operation performed by the second quantum function is based upon a second parameter value.

7. The system of claim 1, wherein the parameter value is a negative of the estimated expectation value under the second quantum state.

8. The system of claim 1, wherein the first configuration of the layered quantum circuit comprises a first quantum function and a second quantum function, wherein executing the first configuration of the layered quantum circuit comprises providing the first quantum state to the first quantum function, the first quantum function configured to perform a first operation over the first quantum state, the second quantum function configured to perform a second operation over an output of the first quantum function.

9. The system of claim 8, wherein the first operation is based upon the expression $e^{-iH_p \Delta t}$, where i is the imaginary unit, $H_p$ is a problem Hamiltonian, and $\Delta t$ is a time difference.

10. The system of claim 8, wherein the second operation is based upon the expression $e^{-i\beta_k H_d \Delta t}$ where i is the imaginary unit, $\beta_k$ is a second parameter value, $H_d$ is a control Hamiltonian, and $\Delta t$ is a time difference.

11. A method, comprising:
    preparing a first quantum state;
    providing the first quantum state to a quantum circuit having a first configuration, the quantum circuit including a first layer in the first configuration, wherein the first configuration of the quantum circuit is configured to output a second quantum state responsive to receiving the first quantum state;
    estimating an expectation value under the second quantum state;
    updating the quantum circuit to a second configuration that includes a second layer, wherein the second layer is based upon a parameter value selected based upon the estimated expectation value under the second quantum state such that a quantum function included in the second layer depends on the parameter value based upon the second quantum state output by the first layer;

providing the first quantum state to the quantum circuit in the second configuration, wherein the second configuration of the quantum circuit is configured to output a third quantum state responsive to receiving the first quantum state;

measuring the third quantum state to identify a solution vector, the solution vector representative of a solution to a discrete optimization problem; and outputting the solution vector as optimization results.

12. The method of claim 11, wherein the parameter value is a second parameter value, and wherein the first layer is based upon a first parameter value.

13. The method of claim 12, wherein the first parameter value is a pre-defined initial parameter value.

14. The method of claim 12, wherein the first parameter value is based upon an expectation value under a fourth quantum state, the fourth quantum state being an output quantum state of the quantum circuit in a third configuration.

15. The method of claim 14, wherein the third configuration fails to include the first layer or the second layer.

16. The method of claim 11, wherein the first layer comprises a first quantum function and a second quantum function, and wherein the second layer comprises a third quantum function and a fourth quantum function, and wherein the first quantum function and the third quantum function are a common quantum function configured to perform a same operation.

17. The method of claim 16, wherein the operation performed by the first quantum function and the third quantum function is based on a problem Hamiltonian $H_p$ that is an objective function representative of the discrete optimization problem.

18. The method of claim 11, wherein in the second configuration the second layer is connected in series with the first layer such that the second layer receives the second quantum state from the first layer.

19. A system for solving a discrete optimization problem, comprising:

a quantum computing device comprising a layered quantum circuit, the quantum computing device configured to perform first acts comprising:

receiving an initial parameter value;

iteratively configuring the layered quantum circuit by performing second acts, the second acts comprising:

a) configuring the quantum computing device to implement a first layer of the layered quantum circuit, the first layer based upon the initial parameter value;

b) providing a first quantum state as input to the layered quantum circuit;

c) estimating an expectation value under a quantum state output by the layered quantum circuit;

d) configuring the quantum computing device to implement an additional layer of the layered quantum circuit, the additional layer based upon a parameter value, the parameter value based upon the estimated expectation value estimated at c) such that a quantum function included in the additional layer depends on the parameter value based upon the quantum state output by an immediately preceding layer; and e) repeating acts b) through d) until a termination condition is met;

providing the first quantum state as input to a final configuration of the layered quantum circuit, the final configuration of the layered quantum circuit being a configuration of the layered quantum circuit subsequent to iteratively configuring the layered quantum circuit;

measuring a final quantum state output by the final configuration of the layered quantum circuit; and outputting data indicative of the final quantum state.

20. The system of claim 19, the first acts further comprising outputting a set of parameters associated with the final configuration of the layered quantum circuit, the system further comprising a classical computing device, wherein the classical computing device comprises at least one processor and memory, wherein the classical computing device and the quantum computing device are configured to jointly execute an instantiation of a quantum approximate optimization algorithm (QAOA) based upon the set of parameters associated with the final configuration of the layered quantum circuit.

* * * * *